US011967272B2

(12) United States Patent
Lin et al.

(10) Patent No.: US 11,967,272 B2
(45) Date of Patent: Apr. 23, 2024

(54) SWEEP VOLTAGE GENERATOR AND DISPLAY PANEL

(71) Applicants: AUO Corporation, Hsinchu (TW); National Cheng-Kung University, Tainan (TW)

(72) Inventors: Chih-Lung Lin, Tainan (TW); Yi-Chen Huang, Tainan (TW); Chih-I Liu, Tainan (TW); Po-Cheng Lai, Tainan (TW); Ming-Yang Deng, Hsinchu (TW); Chia-En Wu, Hsinchu (TW); Ming-Hung Chuang, Hsinchu (TW); Chia-Tien Peng, Hsinchu (TW)

(73) Assignees: AUO Corporation, Hsinchu (TW); National Cheng-Kung University, Tainan (TW)

( * ) Notice: Subject to any disclaimer, the term of this patent is extended or adjusted under 35 U.S.C. 154(b) by 0 days.

(21) Appl. No.: 18/078,092

(22) Filed: Dec. 9, 2022

(65) Prior Publication Data

US 2024/0029630 A1 Jan. 25, 2024

Related U.S. Application Data

(60) Provisional application No. 63/390,770, filed on Jul. 20, 2022.

(30) Foreign Application Priority Data

Sep. 26, 2022 (TW) ................................ 111136313

(51) Int. Cl.
*G09G 3/32* (2016.01)
*G09G 3/20* (2006.01)

(52) U.S. Cl.
CPC ............ *G09G 3/32* (2013.01); *G09G 3/2007* (2013.01); *G09G 2320/02* (2013.01); *G09G 2330/028* (2013.01)

(58) Field of Classification Search
CPC ........................................................ G09G 3/32
USPC ........................................................ 345/211
See application file for complete search history.

(56) References Cited

U.S. PATENT DOCUMENTS 3,109,107 A 10/1963 Lee
3,444,394 A 5/1969 Colvson
2002/0036523 A1 3/2002 Tam
2003/0227448 A1 12/2003 Janssen et al.
2006/0290621 A1* 12/2006 Son ...................... G09G 3/3233 345/82
2009/0085617 A1 4/2009 Ceballos
2017/0115678 A1* 4/2017 Qing ...................... G05F 1/575
(Continued)

FOREIGN PATENT DOCUMENTS

CN 101414811 4/2009

*Primary Examiner* — Long D Pham
(74) *Attorney, Agent, or Firm* — JCIPRNET

(57) ABSTRACT

A sweep voltage generator and a display panel are provided. The sweep voltage generator includes an output node, a current generating block and a voltage regulating block. The output node is used to provide a sweep signal. The current generating block is coupled to the output node, includes a detection path for detecting an output load variation on the output node, and adjusts the sweep signal provided by the output node based on the output load variation. The voltage regulating block is coupled to the output node for regulating a voltage of the output node.

9 Claims, 5 Drawing Sheets

(56) References Cited

U.S. PATENT DOCUMENTS

2021/0159787 A1* 5/2021 Gibson ................. H02M 3/158
2022/0246088 A1* 8/2022 Zhai ..................... G09G 3/2011

* cited by examiner

SWEEP VOLTAGE GENERATOR AND DISPLAY PANEL

CROSS-REFERENCE TO RELATED APPLICATION

This application claims the priority benefit of U.S. provisional application Ser. No. 63/390,770, filed on Jul. 20, 2022 and Taiwan application serial no. 111136313, filed on Sep. 26, 2022. The entirety of each of the above-mentioned patent applications is hereby incorporated by reference herein and made a part of this specification.

BACKGROUND

Technical Field

The disclosure relates to a voltage generator, and in particular relates to a sweep voltage generator and a display panel.

Description of Related Art

In recent years, self-luminous displays has risen, among them, organic light-emitting diode (OLED) displays and quantum dot light-emitting diode (QLED) displays has started to compete for dominance against liquid crystal displays (LCD) in the market of display panels, and the micro light-emitting diode displays are expected to become the mainstream of the next-generation display technology based on their various excellent element characteristics.

In the micro light-emitting diode display, the pixel circuit may receive the sweep signal from an external digital-to-analog converter and use the sweep signal and the written data to determine the current width of the diode. In addition, conventionally, the digital control signal provided by the field programmable gate array (FPGA) is converted into an analog signal through a digital-to-analog converter to generate the required waveform. However, the aforementioned method has a more complicated driving structure and higher cost.

SUMMARY

The disclosure provides a sweep voltage generator and a display panel, which may detect and compensate for the output load variation to achieve the ability to accurately control the gray scale of the pixels.

The sweep voltage generator of the disclosure includes: an output node, a current generating block, and a voltage regulating block. The output node is used to provide a sweep signal. The current generating block is coupled to the output node, includes a detection path for detecting output load variation on the output node, and adjusts the sweep signal provided by the output node based on the output load variation. The voltage regulating block is coupled to the output node for regulating a voltage of the output node.

The display panel of the disclosure includes multiple pixels, multiple gate lines, multiple source lines, and the aforementioned sweep voltage generator. The pixels are arranged in an array. The gate lines respectively extend along a first direction, and are respectively coupled to a portion of the pixels. The source lines respectively extend along a second direction perpendicular to the first direction, and are respectively coupled to a portion of the pixels. A sweep voltage generator is coupled to the pixels to provide a sweep signal to the pixels.

Based on the above, in the sweep voltage generator and the display panel of the embodiment of the disclosure, the current generating block detects the output load variation on the output node through the detection path, and adjusts the sweep signal provided by the output node based on the output load variation. In this way, the sweep voltage generator may detect and compensate for the output load variation to achieve the ability to accurately control the gray scale of the pixels.

In order to make the above-mentioned features and advantages of the disclosure comprehensible, embodiments accompanied with drawings are described in detail below.

DETAILED DESCRIPTION OF DISCLOSED EMBODIMENTS

Unless otherwise defined, all terms (including technical and scientific terms) used herein have the same meaning as that commonly understood by one of ordinary skill in the art to which this disclosure belongs. It should be further understood that terms such as those defined in commonly used dictionaries should be construed as having meanings consistent with their meanings in the context of the related art and the disclosure, and are not to be construed as idealized or excessive formal meaning, unless expressly defined as such herein.

It should be understood that, although the terms “first”, “second”, “third”, or the like may be used herein to describe various elements, components, regions, layers, and/or portions, these elements, components, regions, and/or portions should not be limited by these terms. These terms are only used to distinguish one element, component, region, layer, or portion from another element, component, region, layer, or portion. Thus, “a first element,” “component,” “region,” “layer,” or “portion” discussed below may be referred to as a second element, component, region, layer, or portion without departing from the teachings herein.

The terminology used herein is for the purpose of describing particular embodiments only and is not limiting. As used herein, the singular forms “a”, “an”, and “the” are intended to include the plural forms including “at least one” unless the content clearly dictates otherwise. “Or” means “and/or”. As used herein, the term “and/or” includes any and all combinations of one or more of the associated listed items. It should also be understood that, when used in this specification, the term “including” or “includes” specify a presence of the stated feature, region, whole subject, step, operation, element, and/or part, but not excluding the presence or addition of one or more other features, regions, whole subjects, steps, operations, elements, parts, and/or a combination thereof.

Figure 1A:
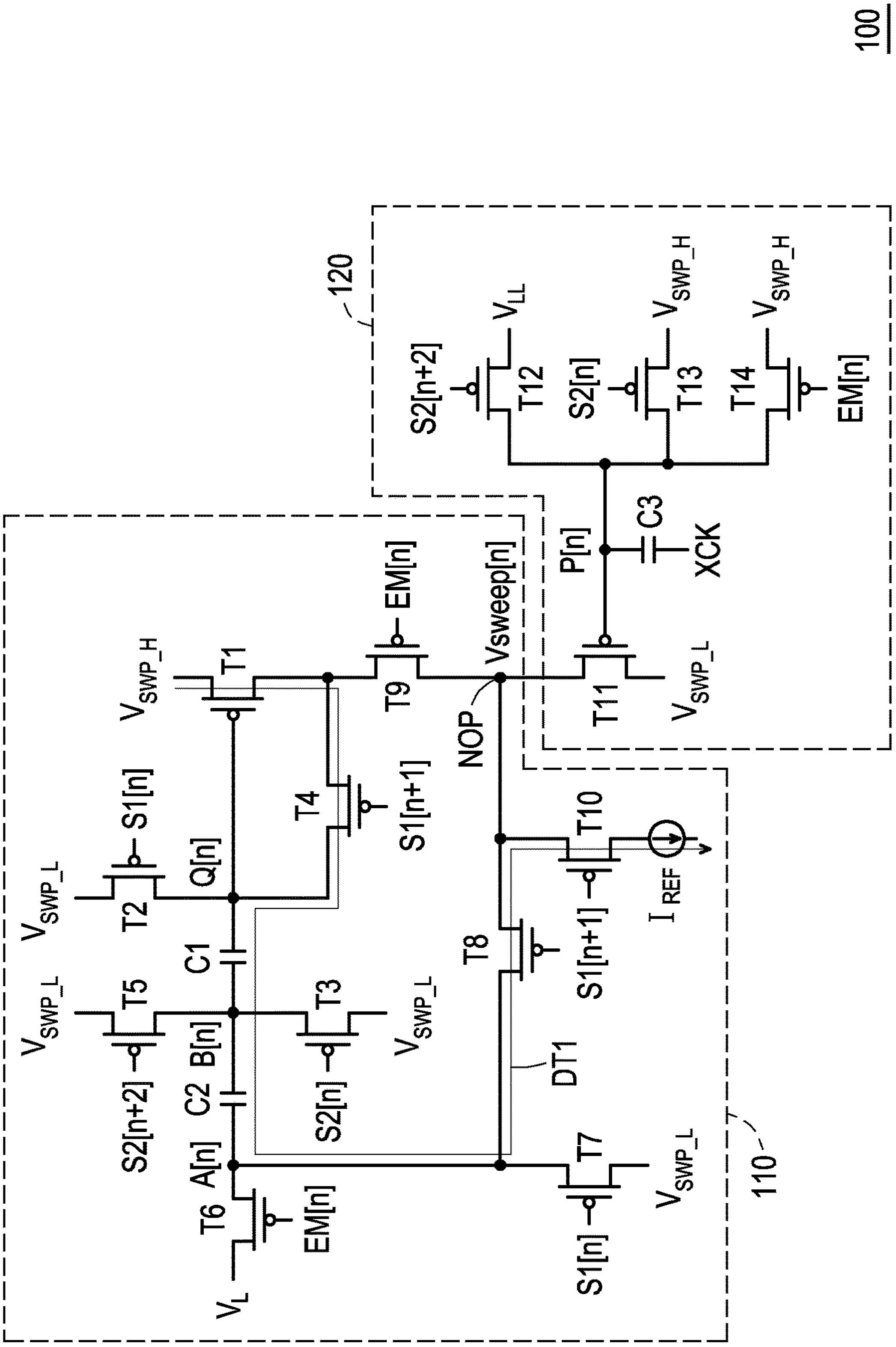
FIG. 1A is a circuit schematic diagram of a sweep voltage generator according to an embodiment of the disclosure.

FIG. 1A is a circuit schematic diagram of a sweep voltage generator according to an embodiment of the disclosure. Referring to FIG. 1A, in this embodiment, the sweep voltage generator 100 includes an output node NOP, a current generating block 110, and a voltage regulating block 120. The output node NOP is used to provide a sweep signal Vsweep[n], where n is the leading number. The current generating block 110 is coupled to the output node NOP, includes a detection path DT1 for detecting output load variation on the output node NOP via the detection path DT1, and adjusts the sweep signal Vsweep[n] provided by the output node NOP based on the output load variation. The voltage regulating block 120 is coupled to the output node NOP for regulating the voltage of the output node NOP. In this way, the sweep voltage generator 100 may output the sweep signal Vsweep[n] required by the pixels driven based on a pulse-width modulation (PWM), and may detect and compensate for the output load variation to achieve the ability to accurately control the gray scale of the pixels.

In this embodiment, the current generating block 110 includes a first transistor T1, a second transistor T2, a third transistor T3, a fourth transistor T4, a fifth transistor T5, a sixth transistor T6, a seventh transistor T7, an eighth transistor T8, a ninth transistor T9, a tenth transistor T10, a first capacitor C1, and a second capacitor C2. The first transistor T1, the second transistor T2, the third transistor T3, the fourth transistor T4, the fifth transistor T5, the sixth transistor T6, the seventh transistor T7, the eighth transistor T8, the ninth transistor T9, and the tenth transistor T10 are, for example, P type transistors, and the first transistor T1, the fourth transistor T4, the first capacitor C1, the second capacitor C2, the eighth transistor T8, and the tenth transistor T10 may form the detection path DT1.

In this embodiment, the first transistor T1 has a first terminal receiving a swing high voltage $V_{SWP\_H}$, a control terminal, and a second terminal. The second transistor T2 has a first terminal receiving a swing low voltage $V_{SWP\_L}$, a control terminal receiving a first control signal S1[*n*], and a second terminal coupled to the control terminal of the first transistor T1. The third transistor T3 has a first terminal, a control terminal receiving a second control signal S2[*n*], and a second terminal receiving the swing low voltage $V_{SWP\_L}$.

The first capacitor C1 is coupled between the second terminal of the second transistor T2 and the first terminal of the third transistor T3. The fourth transistor T4 has a first terminal coupled to the second terminal of the first transistor T1, a control terminal receiving a first control signal S1[*n*+1] of the next stage (i.e., the third control signal), and a second terminal coupled to the control terminal of the first transistor T1. The difference between the first control signal S1[*n*] and the first control signal S1[*n*+1] of the next stage is a delay unit (i.e., half a clock cycle). The fifth transistor T5 has a first terminal receiving the swing low voltage $V_{SWP\_L}$, a control terminal receiving a second control signal S2[*n*+2] of the next two stages (i.e., the fourth control signal), and a second terminal. The difference between the second control signal S2[*n*] and the second control signal S2[*n*+2] of the next two stages is two delay units (i.e., 2*x*0.5 clock cycles).

The sixth transistor T6 has a first terminal, a control terminal receiving a light emission control signal EM[n], and a second terminal receiving a low voltage $V_L$. The second capacitor C2 is coupled between the first terminal of the third transistor T3 and the first terminal of the sixth transistor T6. The seventh transistor T7 has a first terminal coupled to the first terminal of the sixth transistor T6, a control terminal receiving the first control signal S1[*n*], and a second terminal receiving the swing low voltage $V_{SWP\_L}$. The eighth transistor T8 has a first terminal coupled to the output node NOP, a control terminal receiving the third control signal S1[*n*+1], and a second terminal coupled to the first terminal of the sixth transistor T6.

The ninth transistor T9 has a first terminal coupled to the second terminal of the first transistor T1, a control terminal receiving the light emission control signal EM[n], and a second terminal coupled to the output node NOP. The tenth transistor T10 has a first terminal coupled to the output node NOP, a control terminal receiving the first control signal S1[*n*+1] of the next stage, and a second terminal. A current source IREF is coupled to the second terminal of the tenth transistor T10.

In this embodiment, the voltage regulating block 120 includes an eleventh transistor T11, a twelfth transistor T12, a thirteenth transistor T13, a fourteenth transistor T14, and a third capacitor C3. The eleventh transistor T11, the twelfth transistor T12, and the thirteenth transistor T13 are, for example, P type transistors. The eleventh transistor T11 has a first terminal coupled to the output node NOP, a control terminal, and a second terminal receiving the swing low voltage $V_{SWP\_L}$. The third capacitor C3 is coupled between the control terminal of the eleventh transistor T11 and a clock signal XCK. The twelfth transistor T12 has a first terminal receiving a relatively low voltage $V_{LL}$, a control terminal receiving the second control signal S2[*n*+2] of the next two stages, and a second terminal coupled to the control terminal of the eleventh transistor T11.

The thirteenth transistor T13 has a first terminal receiving a swing high voltage $V_{SWP\_H}$, a control terminal receiving a second control signal S2[*n*], and a second terminal coupled to the control terminal of the eleventh transistor T11. The fourteenth transistor T14 has a first terminal receiving the swing high voltage $V_{SWP\_H}$, a control terminal receiving the light emission control signal EM[n], and a second terminal coupled to the control terminal of the eleventh transistor T11.

Figure 1B:
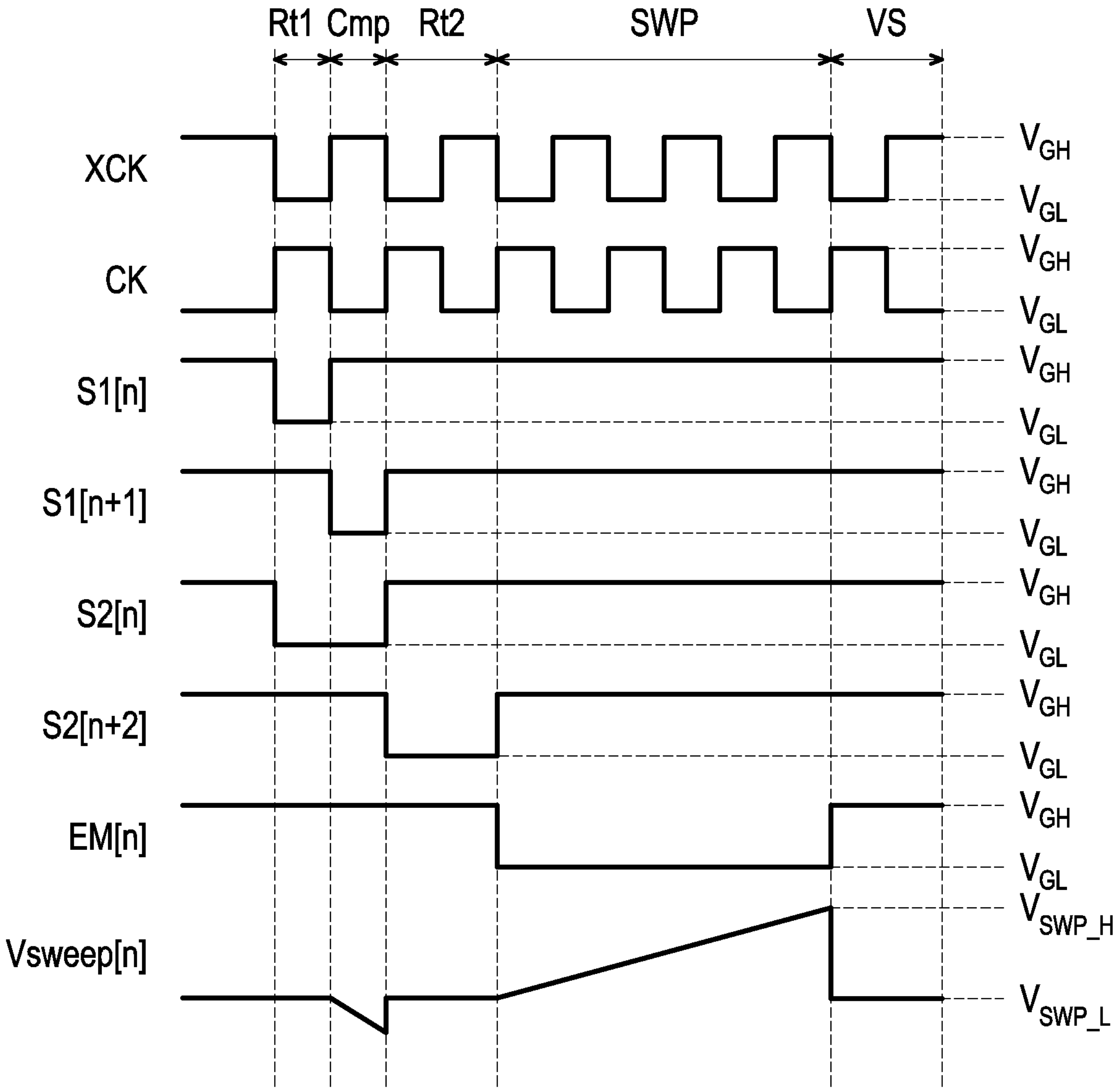
FIG. 1B is a driving waveform schematic diagram of a sweep voltage generator according to an embodiment of the disclosure.

FIG. 1B is a driving waveform schematic diagram of a sweep voltage generator according to an embodiment of the disclosure. Referring to FIG. 1A and FIG. 1B, in this embodiment, the sweep voltage generator 100 is sequentially operated in the a first reset period Rt1, a compensation period Cmp, a second reset period Rt2, a voltage swing period SWP, and a voltage regulation period VS.

In the first reset period Rt1, the first control signal S1[*n*] and the second control signal S2[*n*] are enabled levels (e.g., the gate low voltage VGL), and the first control signal S1[*n*+1] of the next stage, the second control signal S2[*n*+2] of the next two stages, and the light emission control signal EM[n] are disabled levels (e.g., the gate high voltage VGH). At this time, the second transistor T2, the third transistor T3, the seventh transistor T7, and the thirteenth transistor T13 are turned on, and the fourth transistor T4, the fifth transistor T5, the sixth transistor T6, the eighth transistor T8, the ninth transistor T9, the tenth transistor T10, the twelfth transistor T12, and the fourteenth transistor T14 are turned off. In addition, the node voltage Q[n] of the control terminal of the first transistor T1 is the swing low voltage $V_{SWP\_L}$, the node voltage B[n] of the first terminal of the third transistor T3 is the swing low voltage $V_{SWP\_L}$, the node voltage A[n] of the first terminal of the sixth transistor T6 is the swing low voltage $V_{SWP\_L}$, and the node voltage P[n] of the control terminal of the eleventh transistor T11 is the swing high voltage $V_{SWP\_H}$. The first transistor T1 is turned on by the swing low voltage $V_{SWP\_L}$, and the eleventh transistor T11 is turned off by the swing high voltage $V_{SWP\_H}$.

In the compensation period Cmp, the first control signal S1[$n$+1] of the next stage and the second control signal S2[$n$] are enabled levels, and the first control signal S1[$n$], the second control signal S2[$n$+2] of the next two stages, and the light emission control signal EM[n] are disabled levels. At this time, the third transistor T3, the fourth transistor T4, the eighth transistor T8, the tenth transistor T10, and the thirteenth transistor T13 are turned on, and the second transistor T2, the fifth transistor T5, the sixth transistor T6, the seventh transistor T7, the ninth transistor T9, the twelfth transistor T12, and the fourteenth transistor T14 are turned off. In addition, the node voltage Q[n] of the control terminal of the first transistor T1 is the swing high voltage $V_{SWP\_H}$–the threshold voltage $V_{TH1}$ of the first transistor T1, the node voltage B[n] of the first terminal of the third transistor T3 is the swing low voltage $V_{SWP\_L}$, the node voltage A[n] of the first terminal of the sixth transistor T6 is the load variation voltage $V_{Load}$, and the node voltage P[n] of the control terminal of the eleventh transistor T11 is the swing high voltage $V_{SWP\_H}$. The first transistor T1 is turned on by the threshold voltage $V_{TH1}$, and the eleventh transistor T11 is turned off by the swing high voltage $V_{SWP\_H}$.

In the second reset period Rt2, the second control signal S2[$n$+2] of the next two stages is an enabled level, and the first control signal S1[$n$], the first control signal S1[$n$+1] of the next stage, the second control signal S2[$n$] and the light emission control signal EM[n] are disabled levels. At this time, the fifth transistor T5 and the twelfth transistor T12 are turned on, and the second transistor T2, the third transistor T3, the fourth transistor T4, the sixth transistor T6, the seventh transistor T7, the eighth transistor T8, the ninth transistor T9, the tenth transistor T10, the thirteenth transistor T13, and the fourteenth transistor T14 are turned off. In addition, the node voltage Q[n] of the control terminal of the first transistor T1 is the swing high voltage $V_{SWP\_H}$–the threshold voltage $V_{TH1}$ of the first transistor T1, the node voltage B[n] of the first terminal of the third transistor T3 is the swing low voltage $V_{SWP\_L}$, the node voltage A[n] of the first terminal of the sixth transistor T6 is the load variation voltage $V_{Load}$, and the node voltage P[n] of the control terminal of the eleventh transistor T11 is the relatively low voltage $V_{LL}$. The first transistor T1 is turned off because a loop cannot be formed, and the eleventh transistor T11 is turned on by the relatively low voltage $V_{LL}$.

In the voltage swing period SWP, the light emission control signal EM[n] is an enabled level, and the first control signal S1[$n$], the first control signal S1[$n$+1] of the next stage, the second control signal S2[$n$], and the second control signal S2[$n$+2] of the next two stages are disabled levels. At this time, the sixth transistor T6, the ninth transistor T9, and the fourteenth transistor T14 are turned on, and the second transistor T2, the third transistor T3, the fourth transistor T4, the fifth transistor T5, the seventh transistor T7, the eighth transistor T8, the tenth transistor T10, the twelfth transistor T12, and the thirteenth transistor T13 are turned off. In addition, the node voltage Q[n] of the control terminal of the first transistor T1 and the node voltage B[n] of the first terminal of the third transistor T3 are the swing high voltage $V_{SWP\_H}$–the threshold voltage $V_{TH1}$ of the first transistor T1+the low voltage $V_L$–the load variation voltage $V_{Load}$, the node voltage A[n] of the first terminal of the sixth transistor T6 is the low voltage $V_L$, and the node voltage P[n] of the control terminal of the eleventh transistor T11 is the swing high voltage $V_{SWP\_H}$. The turned-on first transistor T1 and the ninth transistor T9 form a current path between the swing high voltage $V_{SWP\_H}$ and the output node NOP, and the current flowing through the current path is only related to the low voltage $V_L$ and the load variation voltage $V_{Load}$, while the eleventh transistor T11 is turned off by the swing high voltage $V_{SWP\_H}$.

In the voltage regulation period VS, the first control signal S1[$n$], the first control signal S1[$n$+1] of the next stage, the second control signal S2[$n$], the second control signal S2[$n$+2] of the next two stages, and the light emission control signal EM[n] are disabled levels. At this time, the second transistor T2, the third transistor T3, the fourth transistor T4, the fifth transistor T5, the sixth transistor T6, the seventh transistor T7, the eighth transistor T8, the ninth transistor T9, the tenth transistor T10, the twelfth transistor T12, the thirteenth transistor T13, and the fourteenth transistor T14 are turned off. In addition, the node voltage Q[n] of the control terminal of the first transistor T1 and the node voltage B[n] of the first terminal of the third transistor T3 are the swing high voltage $V_{SWP\_H}$–the threshold voltage $V_{TH1}$ of the first transistor T1+the low voltage $V_L$–the load variation voltage $V_{Load}$, the node voltage A[n] of the first terminal of the sixth transistor T6 is the low voltage $V_L$, and the node voltage P[n] of the control terminal of the eleventh transistor T11 is pushed-pulled by the clock signal XCK. The first transistor T1 is still turned on but cannot form a current path, and the eleventh transistor T11 is periodically turned on by the push-pull of the node voltage P[n].

According to the above, the current generating block 110 fixes the cross-voltage between the first terminal and the control terminal of the first transistor T1, and simultaneously compensates for the variation of the threshold voltage $V_{TH1}$ of the first transistor T1 to generate a fixed current, so that the current generating block 110 may output the sweep signal Vsweep[n] required by the pixels driven based on a pulse-width modulation (PWM).

In the embodiment of the disclosure, the entire display panel may share the same current source IREF, and in the compensation period Cmp (i.e., the detection phase), the load on the panel is discharged and the charge is stored in the second capacitor C2. When the light emission control signal EM[n] is enabled, it is coupled to the control terminal of the first transistor T1 through the first capacitor C1 and the second capacitor C2, so that the first transistor T1 operates in the saturation region to generate a fixed current and may output the sweep signal Vsweep[n] with a fixed slope required by the pixel.

In the embodiment of the disclosure, the clock signal XCK (or the clock signal CK) is coupled to the node voltage P[N] through the third capacitor C3, and the eleventh transistor T11 is periodically turned on, to regulate the output node NOP.

According to the above, the embodiment of the disclosure provides a circuit structure of the sweep voltage generator 100 for the sweep signal Vsweep[n] required by the pixel driven based on the pulse-width modulation (PWM) that is applied to a mini LED display panel/micro LED display panel. In this way, the sweep signal Vsweep[n] required by the pixel driven based on the pulse-width modulation (PWM) may be output, and the output load variation may be detected and compensated.

Figure 2A:
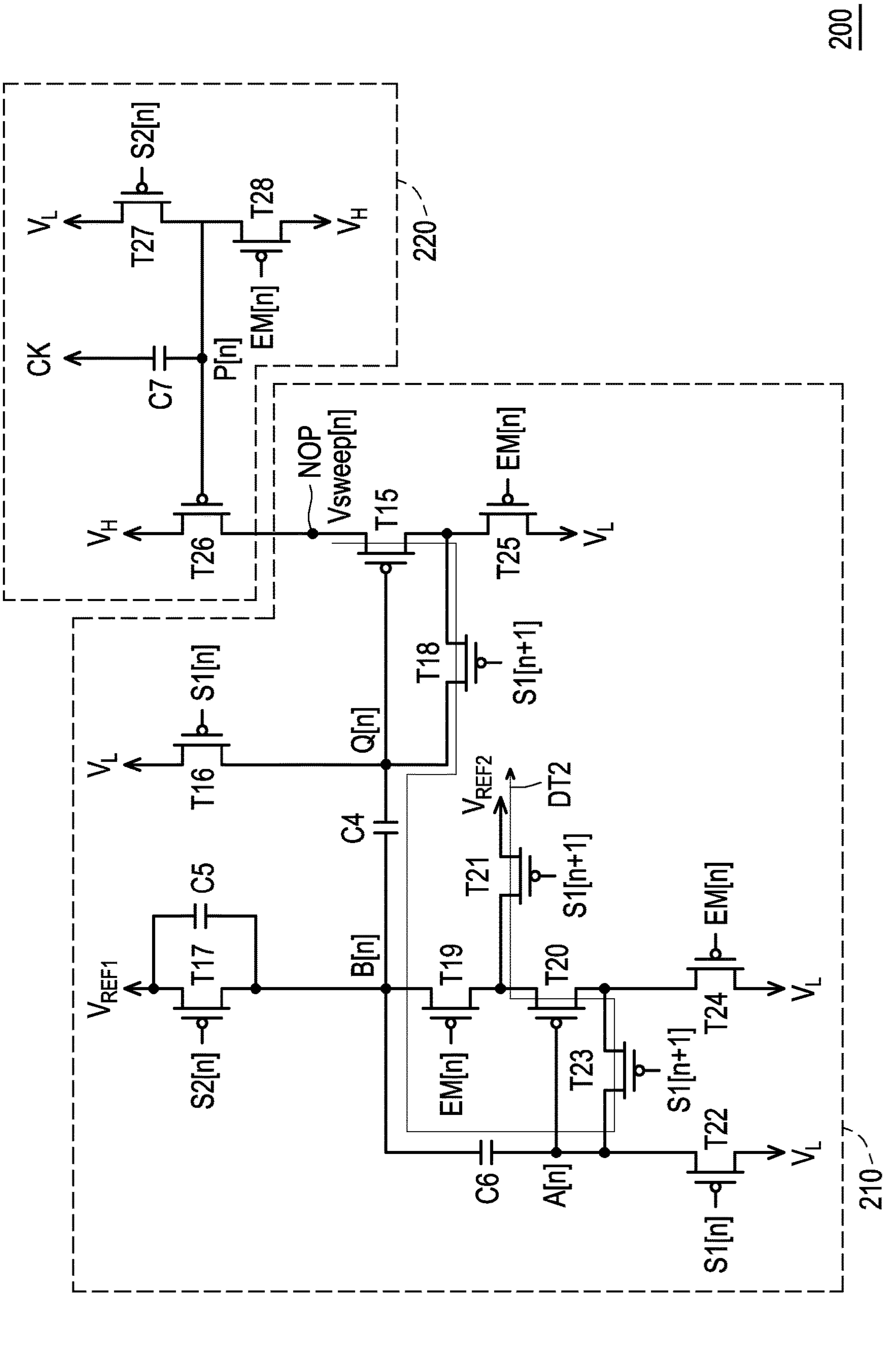
FIG. 2A is a circuit schematic diagram of a sweep voltage generator according to another embodiment of the disclosure.

FIG. 2A is a circuit schematic diagram of a sweep voltage generator according to another embodiment of the disclosure. Referring to FIG. 2A, in this embodiment, the sweep voltage generator 200 includes an output node NOP, a current generating block 210, and a voltage regulating block 220. The output node NOP is used to provide a sweep signal Vsweep[n], where n is the leading number. The current generating block 210 is coupled to the output node NOP, includes a detection path DT2 for detecting output load variation on the output node NOP via the detection path DT2, and adjusts the sweep signal Vsweep[n] provided by the output node NOP based on the output load variation. The voltage regulating block 220 is coupled to the output node NOP for regulating the voltage of the output node NOP. In this way, the sweep voltage generator 200 may compensate the output variation caused by the load and maintain a stable output waveform of the sweep signal Vsweep[n].

In this embodiment, the current generating block 210 includes a fifteenth transistor T15, a sixteenth transistor T16, a seventeenth transistor T17, an eighteenth transistor T18, a nineteenth transistor T19, a twentieth transistor T20, a twenty-first transistor T21, a twenty-second transistor T22, a twenty-third transistor T23, a twenty-fourth transistor T24, a twenty-fifth transistor T25, a fourth capacitor C4, a fifth capacitor C5, and the sixth capacitor C6. The fifteenth transistor T15, the sixteenth transistor T16, the seventeenth transistor T17, the eighteenth transistor T18, the nineteenth transistor T19, the twentieth transistor T20, the twenty-first transistor T21, the twenty-second transistor T22, the twenty-third transistor T23, the twenty-fourth transistor T24, and the twenty-fifth transistor T25 are, for example, P type transistors, and the fifteenth transistor T15, the eighteenth transistor T18, the fourth capacitor C4, the sixth capacitor C6, the twentieth transistor T20, the twenty-first transistor T21, and the twenty-third transistor T23 may form the detection path DT2.

The fifteenth transistor T15 has a first terminal receiving the output node NOP, a control terminal, and a second terminal. The sixteenth transistor T16 has a first terminal receiving the low voltage $V_L$, a control terminal receiving the first control signal S1[*n*], and a second terminal coupled to the control terminal of the fifteenth transistor T15. The seventeenth transistor T17 has a first terminal receiving the first reference voltage $V_{REF1}$, a control terminal receiving the second control signal S2[*n*], and a second terminal. The fourth capacitor C4 is coupled between the second terminal of the sixteenth transistor T16 and the second terminal of the seventeenth transistor T17.

The fifth capacitor C5 is coupled between the first reference voltage $V_{REF1}$ and the second terminal of the seventeenth transistor T17. The eighteenth transistor T18 has a first terminal coupled to the second terminal of the fifteenth transistor T15, a control terminal receiving a first control signal S1[*n*+1] of the next stage (i.e., the third control signal), and a second terminal coupled to the control terminal of the fifteenth transistor T15. The difference between the first control signal S1[*n*] and the first control signal S1[*n*+1] of the next stage is a delay unit (i.e., half a clock cycle).

The nineteenth transistor T19 has a first terminal coupled to the second terminal of the seventeenth transistor T17, a control terminal receiving the light emission control signal EM[n], and a second terminal. The twentieth transistor T20 has a first terminal coupled to the second terminal of the nineteenth transistor T19, a control terminal, and a second terminal. The sixth capacitor C6 is coupled between the second terminal of the seventeenth transistor T17 and the control terminal of the twentieth transistor T20.

The twenty-first transistor T21 has a first terminal with the second reference voltage $V_{REF2}$, a control terminal that receives the first control signal S1[*n*+1] of the next stage, and a second terminal coupled to the second terminal of the nineteenth transistor T19. The twenty-second transistor T22 has a first terminal coupled to the control terminal of the twentieth transistor T20, a control terminal receiving the first control signal S1[*n*], and a second terminal receiving the low voltage $V_L$. The twenty-third transistor T23 has a first terminal coupled to the second terminal of the twentieth transistor T20, a control terminal receiving the first control signal S1[*n*+1] of the next stage, and a second terminal coupled to the control terminal of the twentieth transistor T20.

The twenty-fourth transistor T24 has a first terminal coupled to the second terminal of the twentieth transistor T20, a control terminal receiving the light emission control signal EM[n], and a second terminal receiving the low voltage $V_L$. The twenty-fifth transistor T25 has a first terminal coupled to the second terminal of the fifteenth transistor T15, a control terminal receiving the light emission control signal EM[n], and a second terminal receiving the low voltage $V_L$.

In this embodiment, the voltage regulating block 220 includes a twenty-sixth transistor T26, a twenty-seventh transistor T27, a twenty-eighth transistor T28, and a seventh capacitor C7. The twenty-sixth transistor T26, the twenty-seventh transistor T27, and the twenty-eighth transistor T28 are, for example, P type transistors.

The twenty-sixth transistor T26 has a first terminal receiving the high voltage VH, a control terminal, and a second terminal coupled to the output node NOP. The seventh capacitor C7 is coupled between the clock signal CK and the control terminal of the twenty-sixth transistor T26. The twenty-seventh transistor T27 has a first terminal receiving the low voltage $V_L$, a control terminal receiving the second control signal S2[*n*], and a second terminal coupled to the control terminal of the twenty-sixth transistor T26. The twenty-eighth transistor T28 has a first terminal coupled to the control terminal of the twenty-sixth transistor T26, a control terminal receiving the light emission control signal EM[n], and a second terminal receiving the high voltage VH.

Figure 2B:
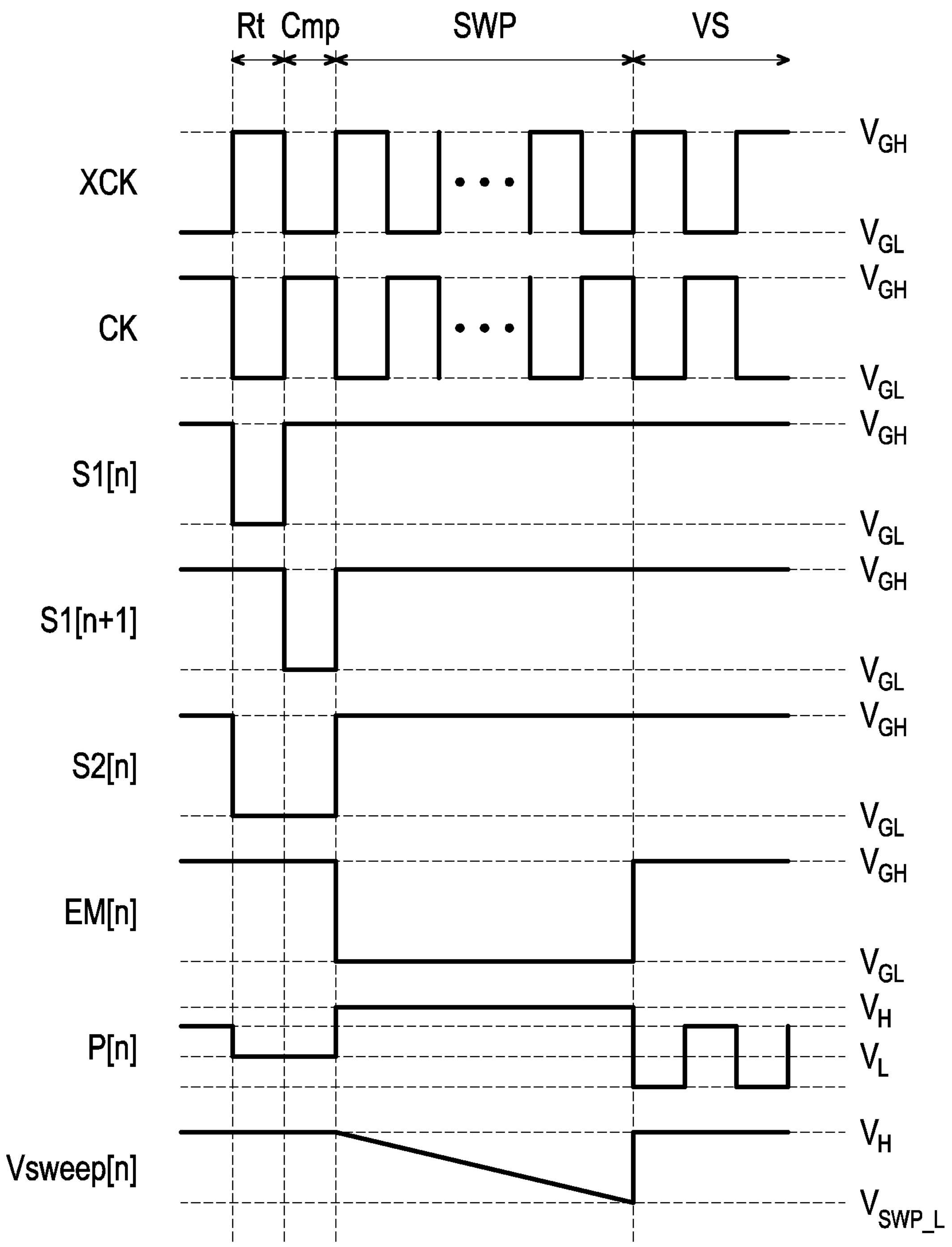
FIG. 2B is a driving waveform schematic diagram of a sweep voltage generator according to another embodiment of the disclosure.

FIG. 2B is a driving waveform schematic diagram of a sweep voltage generator according to another embodiment of the disclosure. Referring to FIG. 2A and FIG. 2B, in this embodiment, the sweep voltage generator 200 is sequentially operated in a reset period Rt, a compensation period Cmp, a voltage swing period SWP, and a voltage regulation period VS.

In the reset period Rt, the first control signal S1[*n*] and the second control signal S2[*n*] are enabled levels (e.g., the gate low voltage VGL), and the first control signal S1[*n*+1] of the next stage, and the light emission control signal EM[n] are disabled levels (e.g., the gate high voltage VGH). At this time, the sixteenth transistor T16, the seventeenth transistor T17, the twenty-second transistor T22, and the twenty-seventh transistor T27 are turned on, and the eighteenth transistor T18, the nineteenth transistor T19, and the twenty-first transistor T21, the twenty-third transistor T23, the twenty-fourth transistor T24, the twenty-fifth transistor T25, and the twenty-eighth transistor T28 are turned off. In addition, the node voltage Q[n] of the control terminal of the fifteenth transistor T15 is the low voltage $V_L$, the node voltage B[n] of the second terminal of the seventeenth transistor T17 is the first reference voltage $V_{REF1}$, the node voltage A[n] of the control terminal of the twentieth transistor T20 is the second reference voltage $V_{REF2}$, and the node voltage P[n] of the control terminal of the twenty-sixth transistor T26 is the low voltage $V_L$. The fifteenth transistor T15 is turned on by the low voltage $V_L$, the twentieth transistor T20 is also turned on by the low voltage $V_L$, and the twenty-sixth transistor T26 is also turned on by the low voltage $V_L$.

In the compensation period Cmp, the first control signal S1[$n$+1] of the next stage and the second control signal S2[$n$] are enabled levels, and the first control signal S1[$n$] and the light emission control signal EM[n] are disabled levels. At this time, the seventeenth transistor T17, the eighteenth transistor T18, the twentieth transistor T20, the twenty-first transistor T21, the twenty-third transistor T23, and the twenty-seventh transistor T27 are turned on, and the sixteenth transistor T16, the nineteenth transistor T19, the twenty-second transistor T22, the twenty-fourth transistor T24, the twenty-fifth transistor T25, and the twenty-eighth transistor T28 are turned off. In addition, the node voltage Q[n] of the control terminal of the fifteenth transistor T15 is the high voltage VH−the threshold voltage $V_{TH15}$ of the fifteenth transistor T15, the node voltage B[n] of the second terminal of the seventeenth transistor T17 is the first reference voltage $V_{REF1}$, the node voltage A[n] of the control terminal of the twentieth transistor T20 is the second reference voltage $V_{REF2}$−the threshold voltage $V_{TH20}$ of the twentieth transistor T20, and the node voltage P[n] of the control terminal of the twenty-sixth transistor T26 is the low voltage $V_L$. The fifteenth transistor T15 is turned on by the threshold voltage $V_{TH15}$, the twentieth transistor T20 is turned on by the threshold voltage $V_{TH20}$, and the twenty-sixth transistor T26 is turned on by the low voltage $V_L$.

In the voltage swing period SWP, the light emission control signal EM[n] is an enabled level, and the first control signal S1[$n$], the first control signal S1[$n$+1] of the next stage, and the second control signal S2[$n$] are disabled levels. At this time, the nineteenth transistor T19, the twenty-fourth transistor T24, the twenty-fifth transistor T25, and the twenty-eighth transistor T28 are turned on, and the sixteenth transistor T16, the seventeenth transistor T17, the eighteenth transistor T18, the twenty-first transistor T21, the twenty-second transistor T22, the twenty-third transistor T23, and the twenty-seventh transistor T27 are turned off. In addition, the node voltage Q[n] of the control terminal of the fifteenth transistor T15 is the high voltage VH−the threshold voltage $V_{TH15}$ of the fifteenth transistor T15−ΔV, the node voltage B[n] of the second terminal of the seventeenth transistor T17 is the first reference voltage $V_{REF1}$−ΔV, the node voltage A[n] of the control terminal of the twentieth transistor T20 is the second reference voltage $V_{REF2}$−the threshold voltage $V_{TH20}$ of the twentieth transistor T20−ΔV, and the node voltage P[n] of the control terminal of the twenty-sixth transistor T26 is the high voltage VH. The fifteenth transistor T15 is turned on by the threshold voltage $V_{TH15}$, the twentieth transistor T20 is turned on by the threshold voltage $V_{TH20}$, and the twenty-sixth transistor T26 is turned off by the high voltage VH.

In the voltage regulation period VS, the first control signal S1[$n$], the first control signal S1[$n$+1] of the next stage, the second control signal S2[$n$], and the light emission control signal EM[n] are disabled levels. At this time, the sixteenth transistor T16, the seventeenth transistor T17, the eighteenth transistor T18, the nineteenth transistor T19, the twenty-first transistor T21, the twenty-second transistor T22, the twenty-third transistor T23, the twenty-fourth transistor T24, the twenty-fifth transistor T25, the twenty-seventh transistor T27, and the twenty-eighth transistor T28 are turned off. In addition, the node voltage Q[n] of the control terminal of the fifteenth transistor T15 is the high voltage VH−the threshold voltage $V_{TH15}$ of the fifteenth transistor T15−ΔV, the node voltage B[n] of the second terminal of the seventeenth transistor T17 is the first reference voltage $V_{REF1}$−ΔV, the node voltage A[n] of the control terminal of the twentieth transistor T20 is the second reference voltage $V_{REF2}$−the threshold voltage $V_{TH20}$ of the twentieth transistor T20−ΔV, and the node voltage P[n] of the control terminal of the twenty-sixth transistor T26 is the high voltage VH. The fifteenth transistor T15 is turned on by the threshold voltage $V_{TH15}$ but cannot form a current path, the twentieth transistor T20 is still turned on but cannot form a loop and thus is turned off, and the twenty-sixth transistor T26 is push-pulled by the clock signal XCK.

According to the above, the current generating block 210 uses a diode-connected structure to compensate the threshold voltage $V_{TH15}$ and the threshold voltage $V_{TH20}$ of the fifteenth transistor T15 and the twentieth transistor T20 to improve the compensation accuracy. The constant current of the twentieth transistor T20 discharges at the node voltage B[n] to generate a gradually decreasing waveform, and then the source follower structure of the fifteenth transistor T15 is used to stabilize the node voltage Q[n] and the output node NOP at a voltage that differs by a threshold voltage $V_{TH15}$ to compensate the load. In addition, the clock signals CK and XCK are coupled through the seventh capacitor C7 to perform 50% periodic voltage regulation on the output node NOP.

Figure 3:
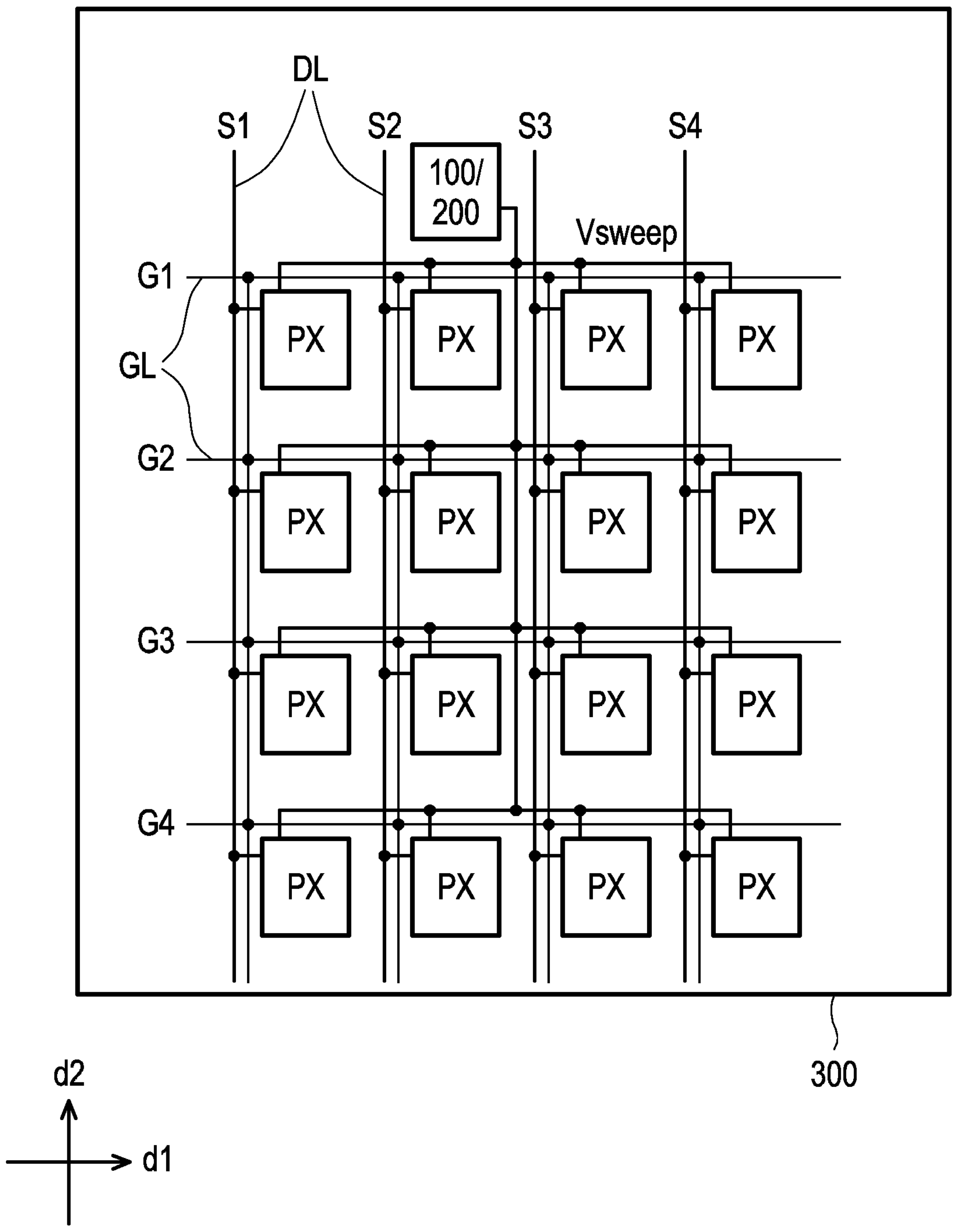
FIG. 3 is a system schematic diagram of a display panel according to an embodiment of the disclosure.

FIG. 3 is a system schematic diagram of a display panel according to an embodiment of the disclosure. Referring to FIG. 1A, FIG. 1B, and FIG. 3, in this embodiment, the display panel 300 includes multiple pixels PX, multiple gate lines GL, multiple source lines DL, and a sweep voltage generator 100/200. The pixels PX are arranged in an array. The gate lines GL respectively receive one of the multiple gate signals (e.g. G1 to G4), respectively extend along a first direction d1, and are respectively coupled to a portion of the pixels PX. The source lines DL respectively receive one of the multiple source signals (e.g., S1 to S4), respectively extend along a second direction d2 perpendicular to the first direction d1, and are respectively coupled to a portion of the pixels PX. The sweep voltage generator 100/200 is coupled to all the pixels PX to simultaneously provide the sweep signal Vsweep to all the pixels PX. The circuit structure and operation of the sweep voltage generator 100/200 may be referred to as shown in FIG. 1A and FIG. 2A, and are not repeated herein.

In this embodiment, the sweep voltage generator 100/200 may be disposed on the display panel 300, but in other embodiments, the sweep voltage generator 100/200 may be disposed on a thin film substrate connected to the display panel 300. For example, the sweep voltage generator 100/200 may be integrated into a source driver, but the embodiment of the disclosure is not limited thereto.

To sum up, in the sweep voltage generator and the display panel of the embodiment of the disclosure, the current generating block detects the output load variation on the output node through the detection path, and adjusts the sweep signal provided by the output node based on the output load variation. In this way, the sweep voltage generator may detect and compensate for the output load variation to achieve the ability to accurately control the gray scale of the pixels.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A sweep voltage generator, comprising:

an output node, used to provide a sweep signal;

a current generating circuit, coupled to the output node, comprising a detection path for detecting an output load variation on the output node, and adjusting the sweep signal provided by the output node based on the output load variation; and a voltage regulating circuit, coupled to the output node for regulating a voltage the output node, wherein a current flowing through the output node is set based on the output load variation, and wherein the current generating circuit comprises:

a first transistor, having a first terminal receiving a swing high voltage, a control terminal, and a second terminal;

a second transistor, having a first terminal receiving a swing low voltage, a control terminal receiving a first control signal, and a second terminal coupled to the control terminal of the first transistor;

a third transistor, having a first terminal, a control terminal receiving a second control signal, and a second terminal receiving the swing low voltage;

a first capacitor, coupled between the second terminal of the second transistor and the first terminal of the third transistor;

a fourth transistor, having a first terminal coupled to the second terminal of the first transistor, a control terminal receiving a third control signal, and a second terminal coupled to the control terminal of the first transistor;

a fifth transistor, having a first terminal receiving the swing low voltage, a control terminal receiving a fourth control signal, and a second terminal;

a sixth transistor, having a first terminal, a control terminal receiving a light emission control signal, and a second terminal receiving a low voltage;

a second capacitor, coupled between the first terminal of the third transistor and the first terminal of the sixth transistor;

a seventh transistor, having a first terminal coupled to the first terminal of the sixth transistor, a control terminal receiving the first control signal, and a second terminal receiving the swing low voltage;

an eighth transistor, having a first terminal coupled to the output node, a control terminal receiving the third control signal, and a second terminal coupled to the first terminal of the sixth transistor;

a ninth transistor, having a first terminal coupled to the second terminal of the first transistor, a control terminal receiving the light emission control signal, and a second terminal coupled to the output node;

a tenth transistor, having a first terminal coupled to the output node, a control terminal receiving the third control signal, and a second terminal; and a current source, coupled to the second terminal of the tenth transistor.

2. The sweep voltage generator according to claim 1, wherein the voltage regulating circuit comprises:

an eleventh transistor, having a first terminal coupled to the output node, a control terminal, and a second terminal receiving the swing low voltage;

a third capacitor, coupled between the control terminal of the eleventh transistor and a clock signal;

a twelfth transistor, having a first terminal receiving a relatively low voltage, a control terminal receiving the fourth control signal, and a second terminal coupled to the control terminal of the eleventh transistor;

a thirteenth transistor, having a first terminal receiving the swing high voltage, a control terminal receiving the second control signal, and a second terminal coupled to the control terminal of the eleventh transistor; and a fourteenth transistor, having a first terminal receiving the swing high voltage, a control terminal receiving the light emission control signal, and a second terminal coupled to the control terminal of the eleventh transistor.

3. The sweep voltage generator according to claim 2, wherein the first transistor, the second transistor, the third transistor, the fourth transistor, the fifth transistor, the sixth transistor, the seventh transistor, the eighth transistor, the ninth transistor, the tenth transistor, the eleventh transistor, the twelfth transistor, the thirteenth transistor, and the fourteenth transistor are respectively a P type transistor.

4. The sweep voltage generator according to claim 1, wherein the third control signal is the first control signal of next stage, and the fourth control signal is the second control signal of next two stages.

5. A sweep voltage generator, comprising:

an output node, used to provide a sweep signal;

a current generating circuit, coupled to the output node, comprising a detection path for detecting an output load variation on the output node, and adjusting the sweep signal provided by the output node based on the output load variation; and a voltage regulating circuit, coupled to the output node for regulating a voltage the output node, wherein the current generating circuit comprises:

a fifteenth transistor, having a first terminal receiving the output node, a control terminal, and a second terminal;

a sixteenth transistor, having a first terminal receiving a low voltage, a control terminal receiving a first control signal, and a second terminal coupled to the control terminal of the fifteenth transistor;

a seventeenth transistor, having a first terminal receiving a first reference voltage, a control terminal receiving a second control signal, and a second terminal;

a fourth capacitor, coupled between the second terminal of the sixteenth transistor and the second terminal of the seventeenth transistor;

a fifth capacitor, coupled between the first reference voltage and the second terminal of the seventeenth transistor;

an eighteenth transistor, having a first terminal coupled to the second terminal of the fifteenth transistor, a control terminal receiving a third control signal, and a second terminal coupled to the control terminal of the fifteenth transistor;

a nineteenth transistor, having a first terminal coupled to the second terminal of the seventeenth transistor, a control terminal receiving a light emission control signal, and a second terminal;

a twentieth transistor, having a first terminal coupled to the second terminal of the nineteenth transistor, a control terminal, and a second terminal;

a sixth capacitor, coupled between the second terminal of the seventeenth transistor and the control terminal of the twentieth transistor;

a twenty-first transistor, having a first terminal with a second reference voltage, a control terminal receiving the third control signal, and a second terminal coupled to the second terminal of the nineteenth transistor;

a twenty-second transistor, having a first terminal coupled to the control terminal of the twentieth transistor, a control terminal receiving the first control signal, and a second terminal receiving the low voltage;

a twenty-third transistor, having a first terminal coupled to the second terminal of the twentieth transistor, a control terminal receiving the third control signal, and a second terminal coupled to the control terminal of the twentieth transistor;

a twenty-fourth transistor, having a first terminal coupled to the second terminal of the twentieth transistor, a control terminal receiving the light emission control signal, and a second terminal receiving the low voltage; and a twenty-fifth transistor, having a first terminal coupled to the second terminal of the fifteenth transistor, a control terminal receiving the light emission control signal, and a second terminal receiving the low voltage.

6. The sweep voltage generator according to claim 5, wherein the voltage regulating circuit comprises:

a twenty-sixth transistor having a first terminal receiving a high voltage, a control terminal, and a second terminal coupled to the output node;

a seventh capacitor, coupled between a clock signal and the control terminal of the twenty-sixth transistor;

a twenty-seventh transistor, having a first terminal receiving the low voltage, a control terminal receiving the second control signal, and a second terminal coupled to the control terminal of the twenty-sixth transistor; and a twenty-eighth transistor, having a first terminal coupled to the control terminal of the twenty-sixth transistor, a control terminal receiving the light emission control signal, and a second terminal receiving the high voltage.

7. The sweep voltage generator according to claim 6, wherein the fifteenth transistor, the sixteenth transistor, the seventeenth transistor, the eighteenth transistor, the nineteenth transistor, the twentieth transistor, the twenty-first transistor, the twenty-second transistor, the twenty-third transistor, the twenty-fourth transistor, the twenty-fifth transistor, the twenty-sixth transistor, the twenty-seventh transistor, and the twenty-eighth transistor are respectively a P type transistor.

8. The sweep voltage generator according to claim 5, wherein the third control signal is the first control signal of next stage.

9. A display panel, comprising:

a plurality of pixels, arranged in an array;

a plurality of gate lines, respectively extending along a first direction, and respectively coupled to a portion of the pixels;

a plurality of source lines, respectively extending along a second direction perpendicular to the first direction, and respectively coupled to a portion of the pixels; and a sweep voltage generator, comprising:

an output node, used to provide a sweep signal;

a current generating circuit, coupled to the output node, comprising a detection path for detecting an output load variation on the output node, and adjusting the sweep signal provided by the output node based on the output load variation; and a voltage regulating circuit, coupled to the output node for regulating a voltage of the output node, wherein the sweep voltage generator is coupled to the pixels to provide the sweep signal to the pixels, and wherein a current flowing through the output node is set based on the output load variation, and wherein the current generating circuit comprises:

a first transistor, having a first terminal receiving a swing high voltage, a control terminal, and a second terminal;

a second transistor, having a first terminal receiving a swing low voltage, a control terminal receiving a first control signal, and a second terminal coupled to the control terminal of the first transistor;

a third transistor, having a first terminal, a control terminal receiving a second control signal, and a second terminal receiving the swing low voltage;

a first capacitor, coupled between the second terminal of the second transistor and the first terminal of the third transistor;

a fourth transistor, having a first terminal coupled to the second terminal of the first transistor, a control terminal receiving a third control signal, and a second terminal coupled to the control terminal of the first transistor;

a fifth transistor, having a first terminal receiving the swing low voltage, a control terminal receiving a fourth control signal, and a second terminal;

a sixth transistor, having a first terminal, a control terminal receiving a light emission control signal, and a second terminal receiving a low voltage;

a second capacitor, coupled between the first terminal of the third transistor and the first terminal of the sixth transistor;

a seventh transistor, having a first terminal coupled to the first terminal of the sixth transistor, a control terminal receiving the first control signal, and a second terminal receiving the swing low voltage;

an eighth transistor, having a first terminal coupled to the output node, a control terminal receiving the third control signal, and a second terminal coupled to the first terminal of the sixth transistor;

a ninth transistor, having a first terminal coupled to the second terminal of the first transistor, a control terminal receiving the light emission control signal, and a second terminal coupled to the output node;

a tenth transistor, having a first terminal coupled to the output node, a control terminal receiving the third control signal, and a second terminal; and a current source, coupled to the second terminal of the tenth transistor.

* * * * *